(12) United States Patent
Weber et al.

(10) Patent No.: US 11,326,018 B2
(45) Date of Patent: May 10, 2022

(54) PROCESS FOR THE SYNTHESIS OF POLYOXAZOLIDINONE COMPOUNDS

(71) Applicant: Covestro Deutschland AG, Leverkusen (DE)

(72) Inventors: Anna Weber, Cologne (DE); Claudine Rangheard, Aachen (DE); Michael Kessler, Cologne (DE); Walter Leitner, Aachen (DE); Christoph Gürtler, Cologne (DE); Carsten Koopmans, Hilden (DE); Thomas Ernst Müller, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 544 days.

(21) Appl. No.: 16/325,532

(22) PCT Filed: Aug. 16, 2017

(86) PCT No.: PCT/EP2017/070736
§ 371 (c)(1),
(2) Date: Feb. 14, 2019

(87) PCT Pub. No.: WO2018/033562
PCT Pub. Date: Feb. 22, 2018

(65) Prior Publication Data
US 2021/0284785 A1 Sep. 16, 2021

(30) Foreign Application Priority Data

Aug. 19, 2016 (EP) .................................... 16185004

(51) Int. Cl.
*C08G 18/00* (2006.01)
*C08G 18/16* (2006.01)
(Continued)

(52) U.S. Cl.
CPC ....... *C08G 18/7621* (2013.01); *C08G 18/003* (2013.01); *C08G 18/166* (2013.01); *D01F 6/96* (2013.01)

(58) Field of Classification Search
CPC ............................ C08G 18/003; C08G 18/166
See application file for complete search history.

(56) References Cited

U.S. PATENT DOCUMENTS 2,964,794 A 12/1960 Peilstöcker et al.
4,087,414 A * 5/1978 Kamiyama .......... C08G 18/003
525/504

(Continued)

FOREIGN PATENT DOCUMENTS

DE 1031507 B 6/1958
DE 1785137 U 3/1959
(Continued)

*Primary Examiner* — Michael L Leonard
(74) *Attorney, Agent, or Firm* — Donald R. Palladino; N. Denise Brown

(57) ABSTRACT

A method for the production of polyoxazolidinone compounds, comprising the step of reacting an isocyanate compound (A) with an epoxide compound (B) in the presence of a catalyst (C), wherein the isocyanate compound (A) comprises a isocyanate compound ($A^1$) wherein the a isocyanate compound (A1) comprising at least two isocyanate groups ($I^1 \geq 2$), preferred two isocyanate groups ($I^1=2$), wherein the epoxide compound (B) comprises a epoxide compound ($B^1$) and an epoxide compound ($B^2$), wherein the epoxide compound ($B^2$) is different from the epoxide compound ($B^1$) wherein the epoxide compound ($B^1$) comprising at least two terminal epoxide groups ($F1 \geq 2$), preferred two terminal epoxide groups ($F^1=2$), linked together by a linking group (L1) and the epoxide compound ($B^2$) comprising at least two terminal epoxide groups ($F^2 \geq 2$)), preferred two terminal epoxide groups ($F^2=2$), linked together by a linking group ($L^2$), wherein the linking group ($L^2$) comprises acyclic and (Continued)

covalent bonds to each other free of conjugated multiple bonds within the main chain, wherein the epoxide compound ($B^2$) is present in the epoxide compounds $B^1$ and $B^2$, in an amount of ≥0.01 mol-% to <10 mol-%, preferred 1-9 mol-% more preferred 3-8 mol-% based on the molar ratio the terminal epoxide groups in the epoxide compound ($B^1$) and of the sum of the terminal epoxide groups in the epoxide compound ($B^1$) and terminal epoxide groups in the epoxide compound ($B^2$).

18 Claims, 1 Drawing Sheet

(51) Int. Cl.
*C08G 18/76* (2006.01)
*D01F 6/96* (2006.01)

(56) References Cited

U.S. PATENT DOCUMENTS

| | | | |
|---|---|---|---|
| 4,495,345 A | 1/1985 | Kawakami et al. | |
| 4,582,723 A * | 4/1986 | Markert | H01B 3/302 427/116 |
| 5,112,932 A | 5/1992 | Koenig et al. | |
| 5,554,489 A | 9/1996 | Ishibashi et al. | |
| 5,672,645 A | 9/1997 | Eckel et al. | |
| 6,265,533 B1 | 7/2001 | Regel et al. | |
| 9,458,281 B2 | 10/2016 | Mueller et al. | |
| 2012/0245252 A1* | 9/2012 | Gan | C08G 59/226 523/400 |
| 2015/0291726 A1 | 10/2015 | Mueller et al. | |
| 2017/0081459 A1 | 3/2017 | Mueller et al. | |
| 2017/0081462 A1 | 3/2017 | Müller et al. | |

FOREIGN PATENT DOCUMENTS

| | | |
|---|---|---|
| EP | 0269324 A1 | 6/1988 |
| EP | 0634445 A1 | 1/1995 |
| GB | 905072 A | 9/1962 |
| GB | 1447500 A | 8/1976 |
| GB | 1592724 A | 7/1981 |

* cited by examiner

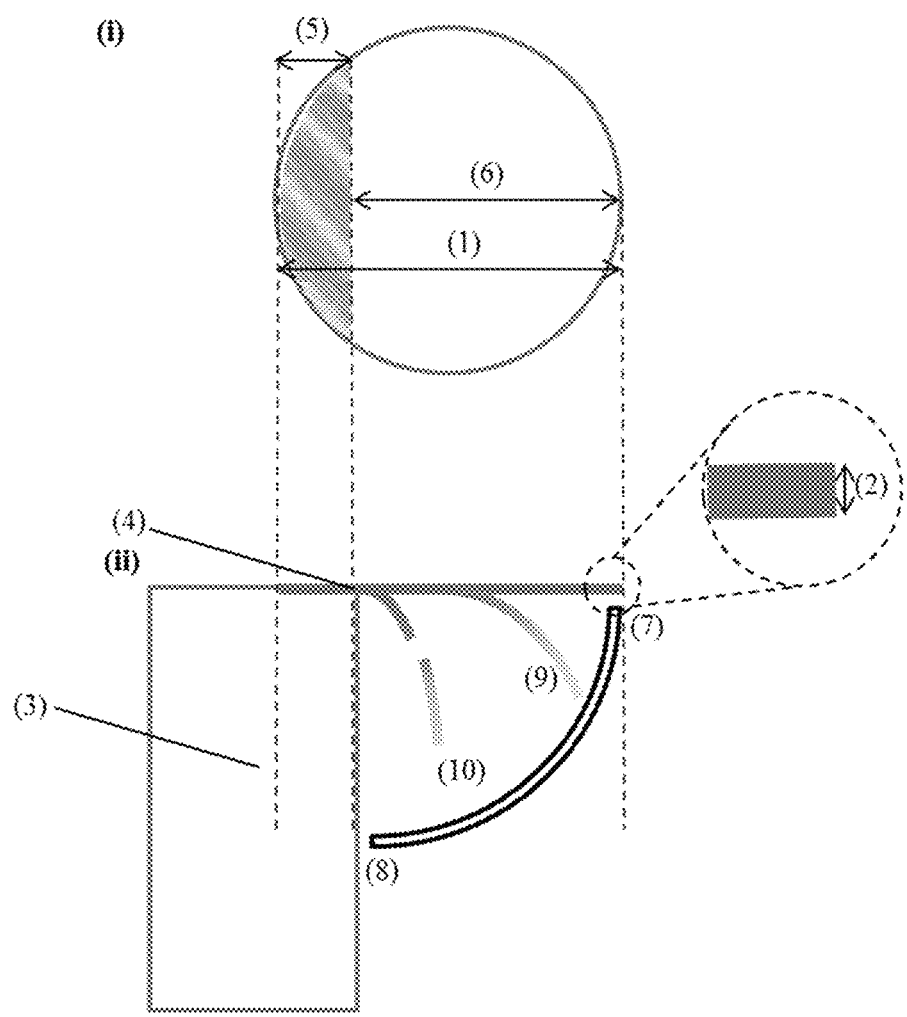

PROCESS FOR THE SYNTHESIS OF POLYOXAZOLIDINONE COMPOUNDS

CROSS REFERENCE TO RELATED APPLICATION

This application is a national stage application under 35 U.S.C. § 371 of PCT/EP2017/070736, filed Aug. 16, 2017, which claims the benefit of European Application No. 16185004.5, filed on Aug. 19, 2016, each of which is incorporated by reference herein.

FIELD

The present invention relates to a method for the production of flexible polyoxazolidinone compounds, comprising the step of reacting an isocyanate component with an epoxide component in the presence of a catalyst. The invention further relates to such compounds, a spun fiber comprising such compounds and a textile comprising such a fiber.

BACKGROUND

Oxazolidinones are widely used structural motifs in pharmaceutical applications, and the cycloaddition of epoxides and isocyanates seems to be a convenient one-pot synthetic route to produce them. Polymeric oxazolidinones are a class of materials whose properties and applications are the subject of ongoing research.

WO 2014/076024 A1 discloses a method for the production of oxazolidinone compounds, comprising the step of slowly reacting an isocyanate compound with an epoxide compound in the presence of a Lewis acid catalyst. The publication further relates to an oxazolidinone compound, obtainable by such a method, with a color as determined according to ASTM D1209-05 (2011) of ≤200 and a molar ratio of the oxazolidinone compound to isocyanurate byproduct o/i of ≥85/15. Lastly, the publication relates to an oligomeric or polymeric oxazolidinone compound, obtainable by a method according to the publication using an isocyanate compound with two or more NCO groups per molecule and an epoxide compound with two or more epoxy groups per molecule, comprising at least two units derived from the isocyanate compound and at least two units derived from the epoxide compound, with a color as determined according to ASTM D1209-05 (2011) of ≤200.

EP2015/060062 discloses a method for the selective production of oxazolidinone compounds with high activities, comprising the step of reacting an isocyanate compound with an epoxide compound in the presence of an onium salt as catalyst and to the oxazolidinone compounds obtainable by said method. The invention further relates to a polyoxazolidinone compound, obtainable by reacting a polyisocyanate compound with a polyepoxide compound in the presence of an onium salt as catalyst, with a regioselectivity towards the 5-substituted 1,3-oxazolidin-2-one regioisomer of ≥78%.

Polymeric oxazolidinones have been reported to have rather brittle properties which limit their usefulness in many fields. One application field where the flexibility of the base material is beneficial is the field of fibers for textiles.

SUMMARY

The present application has the object of providing a method for the production of thermoplastic polyoxazolidinones with improved flexibility/elasticity especially tensile elongations at yield or break with comparable thermal properties than what is known in the prior art.

This object is achieved by a method for the production of polyoxazolidinone compounds, comprising the step of reacting an isocyanate compound (A) with an epoxide compound (B) in the presence of a catalyst (C), wherein the isocyanate compound (A) comprises a isocyanate compound ($A^1$) comprising at least two isocyanate groups ($I^1 \geq 2$), preferred two isocyanate groups ($I^1=2$), wherein the epoxide compound (B) comprises a epoxide compound ($B^1$) and an epoxide compound ($B^2$), wherein the epoxide compound ($B^2$) is different from the epoxide compound ($B^1$), wherein the epoxide compound ($B^1$) comprising at least two terminal epoxide groups ($F^1 \geq 2$), preferred two terminal epoxide groups ($F^1=2$), linked together by a linking group ($L^1$) and the epoxide compound ($B^2$) comprising at least two terminal epoxide groups ($F^2 \geq 2$), preferred two terminal epoxide groups ($F^2=2$), linked together by a linking group ($L^2$), wherein the linking group ($L^2$) comprises acyclic and covalent bonds to each other free of conjugated multiple bonds within the main chain, wherein the epoxide compound ($B^2$) is present in the epoxide compounds ($B^1$) and ($B^2$), in an amount of ≥0.01 mol-% to <10 mol-%, preferred 1-9 mol-% more preferred 3-8 mol-% based on the molar ratio of the terminal epoxide groups in the epoxide compound ($B^1$) and of the sum of the terminal epoxide groups in the epoxide compound ($B^1$) and terminal epoxide groups in the epoxide compound ($B^2$).

BRIEF DESCRIPTION OF THE DRAWINGS

FIG. 1 illustrates the flexibility testing for foils prepared from polyoxazolidinone.

DETAILED DESCRIPTION

As used herein, the term "oxazolidinone compounds" is meant to denote oligooxazolidinone compounds and polyoxazolidinone compounds obtainable by the reaction of a polyisocyanate with a monoepoxide, monoisocyanate with a polyepoxide or a polyisocyanate with a polyepoxide. Particularly preferred oligo- and polyoxazolidinone compounds are linear oligo- and polyoxazolidinone compounds.

As used herein, the term "isocyanate compound" is meant to denote monoisocyanate compounds with one isocyanate group (I=1), polyisocyanate compounds having two isocyanate group (I=2) or more isocyanate groups (I>2), isocyanate-terminated biurets, isocyanurates, uretdiones, carbamates and isocyanate-terminated prepolymers.

As used herein, the term "epoxide compound" is meant to denote monoepoxide compounds with one terminal epoxide group (F=1) and polyepoxide compounds having two terminal epoxide groups (F=2) or more terminal epoxide groups (F>2).

Without wishing to be bound by theory it is believed that the epoxide compound ($B^2$) which is copolymerized into the polyoxazolidinone polymer imparts soft segment properties into the final polymer and therefore serves to produce flexible polymers. The epoxide compound ($B^2$) is preferably present in the epoxide compound ($B^2$) in an amount of ≥1 mol-% to ≤9 mol-%, more preferred ≥3 mol-% to <8 mol-%, based on the molar ratio the terminal epoxide groups in the epoxide compound $B^1$ and of the sum of the terminal epoxide groups in the epoxide compound $B^1$ and terminal epoxide groups in the epoxide compound $B^2$.

The structural features of the epoxide compound ($B^2$) which are believed to be responsible for such a behavior are two epoxy groups linked together by a linking group ($L^2$) which comprises acyclic and covalent bonds to each other free of conjugated multiple bonds within the main chain. Single bonds between atoms within the main chain allow, at least in principle, for a rotation around the bond axis. This is not the case for double or triple bonds within the main chain. If the linking group is a branched structure then it is also possible that there are multiple bonds in the branch as long as there is an uninterrupted sequence (e.g. a non-conjugated double bond) of single bonds between the two epoxy groups.

If the amount of the content of the epoxide compound ($B^2$) is too low or two high, it is expected for the desired flexible entanglement of the polymer chains with each other to be too low or too high that also effects a lowering of the glass transition temperature $T_G$ at to high contents of the epoxide compound ($B^2$). By selecting the amount according to the invention a balance is struck, giving rise to flexible polymer chains which may be spun into fibers or used for other flexible goods.

It is also preferred that the isocyanate compound (A) is added to the epoxide compound (B) in a continuous or step-wise manner with two or more individual addition steps in the step-wise addition. This is to be understood in such a way that during the course of the reaction the isocyanate compound (A) is added to the reaction mixture containing the epoxide compound (B) continuously or in the aforementioned step-wise manner. Included is also the case that the isocyanate component is added via a syringe pump, dripping funnel or other continuous or semi-continuous devices where the isocyanate is brought into the reaction mixture. Although some after-reaction time may be given to the reaction system, the reaction should be essentially complete shortly after the end of the addition of the isocyanate compound.

The addition rate of the isocyanate compound (A) may be in a range of ≥0.1 weight-% to ≤10 weight-% of the isocyanate compound (A) per minute, based on the total weight of the isocyanate compound (A) and the epoxide compound (B) and excluding solvents.

By way of process criteria, one could establish a condition that 30 minutes, preferably 20 minutes and more preferred 10 minutes after the end of the isocyanate addition no more change in the NCO group content of the reaction mixture takes place (within the boundaries of experimental uncertainty). This may be observed, for example, by in-situ IR spectroscopy or analysis of samples of the reaction mixture concerning their NCO content, for example, by titration according to DIN ISO 10283.

In one embodiment of the method according to the invention, the isocyanate compound (A) is added continuously to the reaction mixture. "Continuously" in the meaning of the invention means that the isocyanate compound (A) is added to the reaction mixture over a defined period of time, while at the same time any isocyanate compound (A) present in the reaction mixture is converted to the oxazolidinone compound. Preferably, the rate of isocyanate addition is smaller than or equal to the maximum rate, with which the isocyanate compound (A) can be converted under these reaction conditions to the oxazolidinone compound in order to avoid accumulation of NCO groups in the reaction mixture. The actual concentration of NCO groups in the reaction mixture may be observed, for example, by in-situ IR spectroscopy. If the NCO group concentration is observed to increase above a set value, the rate of isocyanate addition is reduced. Preferably, the isocyanate compound (A) is added to the reaction mixture (consisting of epoxide compound (B), isocyanate compound (A), catalyst (C) and oxazolidinone compound, but not considering solvent, if present) with such an addition rate that the concentration of the isocyanate compound (A) in the reaction mixture is ≤40 weight-%, preferably ≤20 weight-% and more preferred≤15 weight-%.

In another embodiment of the method according to the invention, the amount of isocyanate compound (A) added in each individual addition step is ≥0.1 weight-% to ≤50 weight-% of the total amount of isocyanate compound (A) to be added. Preferably, the amount of isocyanate compound added per individual addition step is ≥1.0 weight-% to ≤40 weight-%, more preferred≥5.0 weight-% to ≤35 weight-% of the total amount of isocyanate compound (A) to be added. Preferably, the time intervals between each individual addition of isocyanate compound (A) to the reaction mixture (consisting of epoxide compound (B), isocyanate compound (A), catalyst (C) and oxazolidinone compound, but not considering solvent, if present) is chosen in such a way that the concentration of the isocyanate compound (A) in the reaction mixture at any given point in time is ≤40 weight-%, preferably ≤20 weight-% and more preferred≤15 weight-%. The actual concentration of NCO groups in the reaction mixture may be observed, for example, by in-situ IR spectroscopy. If the NCO group concentration is observed to increase above a set value, the time interval between the addition steps is increased.

In another embodiment of the method according to the invention, the isocyanate compound (A) and the epoxide compound (B) can be added at the same time to the reactor optionally comprising the catalyst (C) and/or a solvent in a continuous or step-wise manner with two or more individual addition steps in the step-wise addition. The isocyanate compound (A) and the epoxide compound (B) can be mixed and added via one inlet at the same time before entering the reactor or can be added via separate inlets at the same time entering the reactor. In a preferred embodiment, the mixing process can be carried out by static and/or dynamic mixers.

The chain length of the obtained polyoxazolidinone compounds can be controlled by adjusting the ratio between the isocyanate compound (A) and the epoxide compound (B).

The precise content of isocyanate and terminal epoxide groups in the isocyanate compound (A), preferred diisocyanate compound, and epoxide compound (B), preferred diepoxide compound, respectively, are preferentially determined before the polymerisation reaction, e.g., by measuring the isocyanate number according to German standard norm DIN EN ISO 11909 and the epoxide number according to German standard norm DIN EN 1877-1. Preferred is a molar ratio of NCO groups to terminal epoxide groups in the reaction mixture of ≥0.8:1 to ≤1.2:1, more preferred≥0.9:1 to ≤1.1:1.

The present invention will be further described in connection with the following embodiments and aspects. They may be combined freely unless the context indicates otherwise.

In an embodiment of the method according to the invention (α) The isocyanate compound ($A^1$) is added to the epoxide compound ($B^1$) and the epoxide compound ($B^2$) within the epoxide compound (B) in a continuous or step-wise manner with two or more individual addition steps in the step-wise addition and in each individual addition step the amount of isocyanate compound ($A^1$) added is ≥0.1 weight-% to ≤50 weight-% of the total amount of isocyanate compound (A) to be added. Preferably, this amount is ≥1 weight-% to ≤40 weight-%, more preferred≥5 weight-% to ≤20 weight-% or (β) the isocyanate compound ($A^1$) and the epoxide compound ($B^1$) and the epoxide compound ($B^2$) within the epoxide compound (B) are added at the same time to the reactor optionally comprising the catalyst (C) and/or a solvent in a continuous or step-wise manner with two or more individual addition steps in the step-wise addition.

In a preferred embodiment of the method according to the invention is (a).

In a further embodiment of the method according to the invention the epoxide compound ($B^1$) and the epoxide compound ($B^2$) within the epoxide compound (B) will be mixed prior the addition of the isocyanate compound (A) comprising the isocyanate compound ($A^1$).

In an embodiment of the method according to the invention the isocyanate compound ($A^1$) is selected from the group consisting of tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H12-MDI), diphenylmethane diisocyanate (MDI), 4,4'-diisocyanato-3,3'-dimethyldicyclohexylmethane, 4,4'-diisocyanato-2,2-dicyclohexylpropane, poly(hexamethylene diisocyanate), octamethylene diisocyanate, tolylene-α,4-diisocyanate, poly(propylene glycol) tolylene-2,4-diisocyanate terminated, poly(ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)] diisocyanate, poly(tetrafluoroethylene oxide-co-difluoromethylene oxide) α,ω-diisocyanate, 1,4-diisocanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers, 4,4'-, 2,4- or 2,2'-diisocyanatodiphenylmethane or mixtures of these isomers, 4,4-, 2,4'- or 2,2'-diisocyanato-2,2-diphenylpropane-p-xylene diisocyanate and α,α,α',α'-tetramethyl-m- or -p-xylene diisocyanate (TMXDI), mixtures thereof or biurets, isocyanurates, carbamates or uretdiones of the aforementioned isocyanates.

More preferred the isocyanate compound ($A^1$) is selected from the group comprising of tolylene-α,4-diisocyanate, poly(propylene glycol) tolylene-2,4-diisocyanate terminated, 2,4,6-trimethyl-1,3-phenylene diisocyanate, 4-chloro-6-methyl-1,3-phenylene diisocyanate, 3,3'-dimethyl-4,4'-biphenylene diisocyanate, 4,4'-, 2,4- or 2,2'-diisocyanatodiphenylmethane or mixtures of these isomers, 4,4-, 2,4'- or 2,2'-diisocyanato-2,2-diphenylpropane-p-xylene diisocyanate and α,α,α',α'-tetramethyl-m- or -p-xylene diisocyanate (TMXDI), diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

And most preferred the isocyanate compound ($A^1$) is selected from the group consisting of diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

A mixture of two or more of the aforementioned isocyanate compound ($A^1$) can also be used.

In an embodiment of the method according to the invention the epoxide compound ($B^1$) is selected from the group consisting of hydrogenated bisphenol-A diglycidyl ether, bisphenol-A diglycidyl ether, bisphenol-F diglycidyl ether, bisphenol-S diglycidyl ether, 9,9-bis(4-glycidyloxy phenyl) fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether and diglycidyl isophthalate resorcinol diglycidyl ether, bisphenol A diglycidyl ether, bisphenol F diglycidyl ether, diglycidyl terephthalate, and diglycidyl o-phthalate.

More preferred the epoxide compound ($B^1$) is selected from the group consisting of resorcinol diglycidyl ether, bisphenol A diglycidyl ether, and bisphenol F diglycidyl ether.

Most preferred the epoxide compound ($B^1$) is selected from the group consisting of bisphenol A diglycidyl ether, and bisphenol F diglycidyl ether.

A mixture of two or more of the aforementioned epoxide compounds ($B^1$) can also be used.

In an embodiment of the method according to the invention the epoxide compound ($B^2$) compound conforms to the formula (I):

wherein $L^2$ is a $(CH_2)_n$ group with n having a value of ≥1 to ≤50 (preferably ≥2 to ≤20), or wherein $L^2$ is a $(O-CH_2)_n$ group with n having a value of ≥1 to ≤50 (preferably ≥2 to ≤20), or wherein $L^2$ is a $(O-CHR-CH_2)_n$ group with R being hydrogen or alkyl and n having a value of ≥1 to ≤50 (preferably ≥2 to ≤20).

These structural elements of the linking group $L^2$ allow for a high degree of flexibility in the polymer chain.

More preferred the epoxide compound ($B^2$) is selected from the group consisting of neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, sorbitol polyglycidyl ether, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether and/or polybutadiene diglycidyl ether.

Most preferred the epoxide compound ($B^2$) is selected from the group consisting of 1,6-hexanediol diglycidyl ether, ethylene glycol diglycidyl ether, polyethylene glycol diglycidyl ether, diethylene glycol diglycidyl ether.

A mixture of two or more of the aforementioned epoxide compounds ($B^2$) can also be used.

In another embodiment of the method according to the invention the polyoxazolidone further comprises a monofunctional epoxide compound (B³) with (F³=1), a monofunctional isocyanate compound (A²) with (I²=1), and/or a monofunctional carbamate compound (A³) with (I³=1).

More preferred the monofunctional epoxide compound (B³), the monofunctional isocyanate compound (A²) and/or the monofunctional carbamate compound (A³) is selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide, n-hexylisocyanate, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanatate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanate, preferably N-(p-tolyl) carbamate, 4-tert-Butylphenylglycidylether, p-tolyl isocyanate N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate and N-octyl carbamate.

Most preferred the monofunctional epoxide compound (B³), the monofunctional isocyanate compound (A²) and/or the monofunctional carbamate compound (A³) is selected from the group consisting of para-tert.-butylphenylglycidylether or para-tolyl isocyanate p-tolyl isocyanate N-methyl carbamate.

A mixture of two or more of the aforementioned epoxide compound (B³), the monofunctional isocyanate compound (A²) and/or the monofunctional carbamate compound (A³) can also be used.

The monofunctional epoxide compound (B³), the monofunctional isocyanate compound (A²), and/or a monofunctional carbamate compound (A³) may be added to the reaction mixture at the beginning of the polymerisation reaction. The monofunctional epoxide compound (B³), the monofunctional isocyanate compound (A²), and/or a monofunctional carbamate compound (A³) may also be added during the reaction or after the reaction of the isocyanate compound (A¹), epoxide compound (B¹) and the epoxide compound (B²) has been completed. In an alternative embodiment the monofunctional epoxide compound (B³), the monofunctional isocyanate compound (A²), and/or a monofunctional carbamate compound (A³) may be added in portions at different times of the reaction. Preferably the monofunctional epoxide compound (B³), the monofunctional isocyanate compound (A²), and/or a monofunctional carbamate compound (A³) are added at the beginning or during the polymerisation reaction of the isocyanate compound (A¹), epoxide compound (B¹) and the epoxide compound (B²).

As an alternative embodiment, an excess of the monofunctional epoxide compound (B³), the monofunctional isocyanate compound (A²), and/or a monofunctional carbamate compound (A³) is added as to the reaction mixture after the reaction between isocyanate compound (A¹), epoxide compound (B¹) and the epoxide compound (B²) has been completed. Without being bound to a theory, the terminal epoxide groups or the terminal isocyanate groups resulting from the reaction of the epoxide compound (B¹) and/or epoxide compound (B²) and the isocyanate compound (A¹) will be converted to inert end groups by reaction with the monofunctional epoxide compound (B³), monofunctional isocyanate compound (A²), and/or a monofunctional carbamate compound (A³). The excess amount of the monofunctional epoxide compound (B³), monofunctional isocyanate compound (A²), and/or a monofunctional carbamate compound (A³) is subsequently removed from the product, e.g., by extraction, precipitation, distillation, stripping or thin film evaporation.

The addition of the monofunctional epoxide compound (B³) in the epoxide compound (B), for example in an amount of ≥1 to ≤10 mol-%, based on the total amount of epoxy groups in the epoxide compound (B), as a chain terminator leads to polymers which do not have free NCO groups. This enhances their chemical stability.

In an embodiment of the method according to the invention the catalyst (C) is represented by formula (II)

$$[M(R1)(R2)(R3)(R4)]^+{}_n Y^{n-} \quad (II)$$

wherein
M is nitrogen, phosphorous or antimony, preferred phosphorous
(R1), (R2), (R3), (R4) are independently of one another selected from the group comprising linear or branched alkyl groups containing 1 to 22 carbon atoms, optionally substituted with heteroatoms and/or heteroatom containing substituents, cycloaliphatic groups containing 3 to 22 carbon atoms, optionally substituted with heteroatoms and/or heteroatom containing substituents, C1 to C3 alkyl-bridged cycloaliphatic groups containing 3 to 22 carbon atoms, optionally substituted with heteroatoms and/or heteroatom containing substituents and aryl groups containing 6 to 18 carbon atoms, optionally substituted with one or more alkyl groups containing 1 to 10 carbon atoms and/or heteroatom containing substituents and/or heteroatoms,
wherein
(R4) is different from (R1), (R2), and (R3) and is selected from the group comprising branched alkyl groups containing 3 to 22 carbon atoms, cycloaliphatic groups containing 3 to 22 carbon atoms, C1 to C3 alkyl-bridged cycloaliphatic groups containing 3 to 22 carbon atoms and aryl groups, containing 6 to 18 carbon atoms, optionally substituted with one or more alkyl groups containing 1 to 10 carbon atoms and/or heteroatom containing substituents and/or heteroatoms, wherein (R1), (R2) are aryl groups containing 6 to 18 carbon atoms,
Y is a halide, carbonate, nitrate, sulfate or phosphate anion, more preferred a halide or carbonate and
n is an integer of 1, 2 or 3.

In one embodiment of the invention M of formula (II) is phosphorous.

In another embodiment of the invention (R1), (R2), (R3) of formula (II) independently of one another are aryl groups containing 6 to 18 carbon atoms, preferably (R1), (R2), (R3) of formula (II) are each phenyl groups.

In another embodiment of the invention, (R4) of formula (II) is selected from the group comprising branched alkyl groups containing 3 to 6 carbon atoms, cycloaliphatic groups containing 3 to 8 carbon atoms, C1 to C3 alkyl-bridged cycloaliphatic groups containing 1 to 12 carbon atoms and aryl groups, containing 6 to 18 carbon atoms, optionally substituted with a heteroatom containing group.

In another embodiment of the invention (R4) of formula (II) is selected from the group comprising branched alkyl groups containing 3 to 6 carbon atoms, cycloaliphatic groups containing 3 to 8 carbon atoms, C1 to C3 alkyl-bridged cycloaliphatic groups containing 3 to 12 carbon atoms and aryl groups, containing 6 carbon atoms which are substituted with a heteroatom containing group.

In another embodiment of the invention (R4) of formula (II) is selected from the group comprising branched alkyl groups containing 3 to 6 carbon atoms, cycloaliphatic groups containing 3 to 8 carbon atoms, C1 to C3 alkyl-bridged cycloaliphatic groups containing 3 to 12 carbon atoms and phenyl, substituted with at least one heteroatom containing group, wherein the heteroatom is selected from O, N and/or S.

In another embodiment of the invention (R4) of formula (II) is selected from the group comprising of branched alkyl groups containing 3 to 6 carbon atoms, cycloaliphatic groups containing 3 to 8 carbon atoms, C1 to C3 alkyl-bridged cycloaliphatic groups containing 3 to 12 carbon atoms and phenyl, substituted with a O-methyl, O-ethyl, O-propyl, O-butyl, O-phenyl, N-(methyl)2-, N-(ethyl)2-, N-(phenyl)2, S-methyl, S-ethyl, S-propyl, S-butyl, or S-phenyl-group.

In another embodiment of the invention (R4) of formula (II) is selected from i-propyl, i-butyl, sec-butyl, t-butyl, n-pentyl, iso-pentyl, neo-pentyl, n-hexyl, 2-hexyl, 3-hexyl, 2-ethyl-hexyl, cyclopentyl, cyclohexyl, cycloheptyl, cyclooctyl, CH2-cyclopentyl, CH2-cyclohexyl, CH2-cycloheptyl, CH2-norbornyl, CH2-bicyclo-[2.2.1]-heptyl, CH2-adamantyl, CH2-bicyclo-[2.2.2]-octyl, CH2-twistyl, CH2-bicyclo-[3.3.3]-undecyl, 2-methoxyphenyl, 4-methoxyphenyl, 2-ethoxyphenyl, 4-ethoxyphenyl, 2-propoxyphenyl, 4-propoxyphenyl, 2-isopropoxyphenyl, 4-isopropoxyphenyl, 2-phenoxyphenyl, 4-phenoxyphenyl, 2-(N,N-dimethylamino)phenyl, 4-(N,N-dimethylamino)phenyl, 2-(N,N-ethylmethylamino)-phenyl, 4-(N,N-ethylmethylamino)-phenyl, 2-(N,N-diethylamino)phenyl, 4-(N,N-diethylamino)-phenyl, 2-(N-pyrrolidyl)-phenyl, 4-(N-pyrrolidyl)-phenyl, 2-(methylthio)-phenyl, 4-(methylthio)-phenyl, 2-(ethylthio)-phenyl and 4-(ethylthio)phenyl.

In one preferred embodiment of the invention a catalyst (C) of formula (II) is used, wherein
M is phosphorous, (R1), (R2) and (R3) are each phenyl groups and
(R4) is selected from the group comprising branched alkyl groups containing 3 to 22 carbon atoms, preferably 3 to 6 carbon atoms, particularly preferred 4 carbon atoms, cycloaliphatic groups containing 3 to 22 carbon atoms, preferably 3 to 15 carbon atoms, particularly preferred 3 to 8 carbon atoms, C1 to C3 alkyl-bridged cycloaliphatic groups containing 3 to 22 carbon atoms, preferably 3 to 15 carbon atoms, particularly preferred 3 to 12 carbon atoms and aryl groups, containing 6 to 18 carbon atoms, optionally substituted with a heteroatom containing group,
Y is a halide, carbonate, nitrate, sulphate or phosphate anion, preferably a halide or carbonate anion, more preferred chloride, bromide or carbonate and
n is an integer of 1, 2 or 3.

In another preferred embodiment of the invention a catalyst (C) of formula (II) is used, wherein M is phosphorous, (R1), (R2) and (R3) are each phenyl groups and (R4) is selected from the group comprising i-propyl, i-butyl, sec-butyl, t-butyl, n-pentyl, iso-pentyl, neo-pentyl, n-hexyl, 2-hexyl, 3-hexyl, 2-ethyl-hexyl, cyclopentyl, cyclohexyl, cycloheptyl, cyclooctyl, CH2-cyclopentyl, CH2-cyclohexyl, CH2-cycloheptyl, CH2-norbornyl, CH2-bicyclo-[2.2.1]-heptyl, CH2-adamantyl, CH2-bicyclo-[2.2.2]-octyl, CH2-twistyl, CH2-bicyclo-[3.3.3]-undecyl, 2-methoxyphenyl, 4-methoxyphenyl, 2-ethoxyphenyl, 4-ethoxyphenyl, 2-propoxyphenyl, 4-propoxyphenyl, 2-isopropoxyphenyl, 4-isopropoxyphenyl, 2-phenoxyphenyl, 4-phenoxyphenyl, 2-(N,N-dimethylamino)phenyl, 4-(N,N-dimethylamino) phenyl, 2-(N,N-ethylmethylamino)-phenyl, 4-(N,N-ethylmethylamino)-phenyl, 2-(N,N-diethylamino)-phenyl, 4-(N,N-diethylamino)-phenyl, 2-(N-pyrrolidyl)-phenyl, 4-(N-pyrrolidyl)-phenyl, 2-(methylthio)-phenyl, 4-(methylthio) phenyl, 2-(ethylthio)-phenyl and 4-(ethylthio)-phenyl, Y is a halide, carbonate, nitrate, sulphate or phosphate anion, preferably a halide or carbonate anion, more preferred chloride, bromide or carbonate and n is an integer of 1, 2 or 3.

In another embodiment of the invention a catalyst (C) of formula (II) is used, wherein
M is phosphorous, (R1), (R2) and (R3) are each phenyl groups and (R4) is selected from the group comprising cyclopentyl, cyclohexyl, CH2-adamantyl, 2-methoxyphenyl and 4-methoxyphenyl,
Y is a halide, carbonate, nitrate, sulphate or phosphate anion, preferably a halide or carbonate anion, more preferred chloride, bromide or carbonate and
n is an integer of 1, 2 or 3.

In another embodiment of the invention a catalyst (C) is selected from the group consisting of [PPh$_3${p-C$_6$H$_4$(OMe)}]Br, PPh$_3${p-C$_6$H$_4$(OMe)}]$_2$(CO$_3$), [PPh$_4$]Br, [P(nBu)$_4$]Br, [PPh$_3$(CH$_2$-adamantyl)]Br and [PPh$_3$(cyclohexyl)]Br.

In another embodiment of the invention the catalyst (C) according to formula (II) is present in an amount of ≥0.0001 mol-% to ≤10.0 mol-%, relative to the amount of isocyanate compound to be added to the reaction mixture. Preferably, the catalyst is present in an amount of ≥0.001 mol-% to ≤5 mol-%, more preferred≥0.01 mol-% to ≤3 mol-%.

In one embodiment the method according to the invention is performed in the presence of a solvent. Suitable solvents are high-boiling non-protic halogenated aromatic or high-boiling non-protic aliphatic heterocyclic solvents such N-methylpyrrolidone (NMP), N-ethylpyrrolidone, cyclic ethylene carbonate, cyclic propylene carbonate, sulfolane, chlorobenzene, the different isomers of dichlorobenzene, the different isomers of trichlorobenzene, decalin, hexamethylphosphoramide, dimethylformamide, N,N-dimethylacetamide (DMAc), and dimethyl sulfoxide or mixtures of one or more of the aforementioned solvents among each other or with further non-protic solvents.

Preferred solvents are selected from the group consisting of N-methylpyrrolidone (NMP), sulfolane, DMAc and ortho-dichlorobenzene.

Most preferred solvent is ortho-dichlorobenzene and/or N-methylpyrrolidone (NMP).

In another embodiment of the method according to the invention, the reaction is conducted in the absence of a solvent. Preferably, the reaction mixture contains only the epoxide compound (B), the isocyanate compound (A) and the catalyst (C) as well as the oxazolidinone compound formed during the reaction.

In another embodiment of the method according to the invention, wherein the reaction is performed at reaction temperatures of ≥130 C to ≤280° C., preferably at a temperature of ≥140° C. to ≤240° C., most preferred at a temperature of ≥155° C. to ≤210° C.

In an embodiment of the method according to the invention the method further comprises the step of isolating the polyoxazolidinone compound obtained by the reaction, heating the polyoxazolidinone compound and pressing the polyoxazolidinone compound into a desired shape.

Another aspect of the present invention is a polyoxazolidinone compound, obtainable by a method according to the invention.

In an embodiment of the invention the number average molecular weight $M_n$ of the polyoxazolidinone compound may be, for example, in the range of ≥320 g/mol to ≤10'000'000 g/mol, preferably ≥480 g/mol to ≤600'000 g/mol and most preferably ≥2'000 g/mol to ≤200'000 g/mol, as determined with gel permeation chromatography (GPC).

In an embodiment of the compound according to the invention the compound has a glass transition temperature, determined according to DIN EN ISO 51007 and a heating rate of 10° C./min of ≥150° C. to ≤200° C.

The present invention further relates to a spun fiber, comprising a polyoxazolidinone compound according to the invention and a textile, comprising such a spun fiber.

The method according to the invention is suited for the synthesis of oxazolidinone compounds with interesting properties for use, for example, as pharmaceutics or antimicrobiotics. Polyoxazolidinones obtained by the method according to the invention are particularly suited as polymer building blocks in polyurethane chemistry. For example, epoxy-terminated oligomeric oxazolidinones (oligooxazolidinones) may be reacted with polyols or polyamines to form foams or thermosets. Such epoxy-terminated oligomeric oxazolidinones are also suited for the preparation of composite materials. Epoxy-terminated oligomeric oxazolidinones (oligooxazolidinones) may also be reacted with their NCO-terminated counterparts to form high molecular weight polyoxazolidinones, which are useful as transparent, high temperature-stable materials. Polyoxazolidinones with high molecular weight obtained by the method according to the invention are particularly suited as transparent, high temperature-stable thermoplastic materials.

The conventional additives for these thermoplastics, such as fillers, UV stabilizers, heat stabilizers, antistatics and pigments, can also be added in the conventional amounts to the polyoxazolidinones according to the invention; the mould release properties, the flow properties and/or the flame resistance can optionally also be improved by addition of external mould release agents, flow agents and/or flame-proofing agents (e.g. alkyl and aryl phosphites and phosphates, alkyl- and arylphosphanes and low molecular weight carboxylic acid alkyl and aryl esters, halogen compounds, salts, chalk, quartz flour, glass fibres and carbon fibres, pigments and a combination thereof. Such compounds are described e.g. in WO 99/55772, p. 15-25, and in the corresponding chapters of the "Plastics Additives Handbook", ed. Hans Zweifel, 5th edition 2000, Hanser Publishers, Munich).

The polyoxazolidinones according to the invention, optionally in a mixture with other thermoplastics, such as, for example, graft polymers based on acrylonitrile/butadiene/styrene or graft copolymers based on acrylate rubber (see, for example, the graft polymers described in EP-A 640 655) and/or conventional additives, when processed to any desired shaped articles/extrudates, can be employed in all instances where polycarbonates, polyester carbonates and polyesters which are already known are employed. Further possible uses of the polyoxazolidinones according to the invention are:

1. Safety panes, which as is known are required in many areas of buildings, vehicles and aircraft, and also as visors of helmets.
2. Production of films, in particular films for skis.
3. Production of blow-moulded articles (see also U.S. Pat. No. 2,964,794), for example 1 to 5 gallon water bottles.
4. Production of transparent sheets, in particular hollow chamber sheets, for example for covering buildings such as railway stations, greenhouses and lighting installations.
5. Production of optical data storage media.
6. For production of traffic light housings or traffic signs.
7. For production of foams (see, for example, DE-B 1 031 507).
8. For production of threads and wires (see, for example, DE-B 1 137 167 and DE-A 1 785 137).
9. As translucent plastics with a content of glass fibres for lighting purposes (see, for example, DE-A 1 554 020).
10. As translucent plastics with a content of barium sulfate, titanium dioxide and/or zirconium oxide or organic polymeric acrylate rubbers (EP-A 0 634 445, EP-A 269324) for the production of transparent and light-scattering mouldings.
11. For the production of precision injection mouldings, such as, for example, lens holders. Polyoxazolidinones with a content of glass fibres which optionally additionally contain about 1 to 10 wt. % of $MoS_2$, based on the total weight, are used for this purpose.
12. For the production of optical equipment components, in particular lenses for photographic and film cameras (see, for example, DE-A 2 701 173).
13. As light transmission carriers, in particular as light conductor cables (EP-A 0 089 801).
14. As electrical insulating materials for electrical conductors and for plug housings and plug connectors.
15. Production of mobile telephone housings with improved resistance to perfume, shaving lotion and skin perspiration.
16. Network interface devices.
17. As a carrier material for organic photoconductors.
18. For the production of lamps, e.g. searchlights, as so-called headlamps, light-diffusing panes or internal lenses, as well as long-distance lamps.
19. For medical uses, such as e.g. oxygenators, dialyzers.
20. For foodstuffs uses, such as e.g. bottles, utensils and chocolate moulds.
21. For uses in the automobile field where contact with fuels and lubricants may occur, such as, for example, bumpers, optionally in the form of suitable blends with ABS or suitable rubbers.
22. For sports articles, such as e.g. slalom poles or ski boot buckles.
23. For household articles, such as e.g. kitchen sinks and letterbox housings.

24. For housings, such as e.g. electrical distribution boxes
25. Housings for electric toothbrushes and hairdryer housings.
26. Transparent washing machine portholes with improved resistance to the wash solution.
27. Safety glasses, visors or optical corrective glasses.
28. Lamp covers for kitchen equipment with improved resistance to kitchen fumes, in particular oil vapours.
29. Packaging films for medicaments.
30. Chip boxes and chip supports.
31. For other uses, such as e.g. fattening stable doors or animal cages.
32. Safety helmets This Application likewise provides the shaped articles and mouldings and extrudates from the polymers according to the invention.

EXAMPLES

The present invention will be further described with reference to the FIG. 1 and examples without wishing to be limited by them.
Epoxides
Epoxide $B^1$: Bisphenol-A-diglycidylether (Epikote Resin 162), purity+99%, Hexion, Germany.
Epoxide $B^2$: Diethylene glycol diglycidyl ether (Denacol EX-850) Nagase Chem Tex Corporation, Japan
Epoxide $B^3$: para-tert.-butylphenylglycidylether (94%, Denacol EX-146, Nagase Chem Tex Corporation, Japan),
Isocyanates
Isocyanate $A^1$: 2,4-Toluenediisoyanate>99% 2,4-Isomer, Covestro AG, Germany
Solvents:
N-Methylpyrrolidinone (NMP), purity 99.5%, anhydrous, was obtained from Sigma-Aldrich, Germany.
Ortho-dichlorobenzene (o-DCB), purity 99%, anhydrous, was obtained from Sigma-Aldrich, Germany
Catalysts
Catalyst C: [PPh$_3$\{p-C$_6$H$_4$(OMe)\}]Br, synthesized as described below:

A glass flask (20 mL) was charged with 4-bromoanisol (381.5 mg, 2.04 mmol), PPh$_3$ (562 mg, 2.14 mmol), NiBr$_2$ (22.3 mg, 0.10 mmol) and ethylene glycol (0.68 mL, 12.19 mmol). The mixture was stirred (600 rpm) at room temperature for 10 min using a magnetic stirrer bar of 0.3 cm length. The flask was then placed into a hot oil bath set to 180° C. for 20 minutes. The heating of the oil bath was then switched off and the reaction mixture cooled to room temperature within of 30 min. Dichloromethane (35 mL) was added to the crude reaction mixture and the organic layer was washed three times with water and once with brine, dried over MgSO$_4$, filtered and the solvent partially removed under partial vacuum. A brown highly viscous fluid was obtained, which was diluted with dichloromethane (ca. 2 mL). Diethylether (15 mL) was added to this mixture, while shaking the flask vigorously. A white precipitate was obtained, which was collected, washed two times with diethylether and dried in a partial vacuum to afford the product as a white solid.
Characterisation of Polyoxazolidinone:

The average chain length of the polyoxazolidinones was adjusted by the relative molar ratio of the isocyanate compound A and epoxide compound B used in the particular reaction.

When an epoxide terminated polyoxazolidinone is desired, the diepoxide is used in excess. Equation 1 (eq. 1) below gives a general mathematical formula to calculate the average chain length n in the oligomeric and/or polymeric product based on the molar ratios of diisocyanate and diepoxide compound employed.

$$n=1/[\{(\text{amount of diepoxide in mol})/(\text{amount of diisocyanate in mol})\}-1] \quad \text{(eq. 1)}$$

When an isocyanate group terminated polyoxazolidinone is desired, the isocyanate compound A is used in excess. Equation 2 (eq. 2) below gives a general mathematical formula to calculate the average chain length n in the oligomeric and/or polymeric product based on the molar ratios of isocyanate compound $A^1$ and epoxide compound $B^1$ and epoxide compound $B^2$ employed.

$$n=1/[\{(\text{amount of isocyanate compound}A^1 \text{ in mol})/(\text{amount of epoxide compound}B^1 \text{and epoxide compound}B^2 \text{ in mol})\}-1] \quad \text{(eq. 2)}$$

Solid State Infrared (IR) Spectroscopy:

The solid state IR analysis was performed on a Bruker ALPHA-P IR spectrometer equipped with a diamond probe head. Before obtaining the IR spectrum of the sample, a background spectrum was recorded against ambient air. After that, a small sample (several milligrams) of the sample was applied to diamond probe and the IR spectrum recorded on a computer connected with the spectrometer using OPUS 6.5 software averaging over 32 spectra obtained in the range of 4000 to 400 cm$^{-1}$ with a resolution of 4 cm$^{-1}$.
Gel Permeation Chromatography (GPC):

GPC measurements were performed at 40° C. in N,N-dimethylacetamide (DMAc, flow rate of 0.6 mL min$^{-1}$). The column set consisted of 4 consecutive columns (GRAM 3000, HEMA300, HEMA 40, HEMA 40). Samples (concentration 5-15 g L$^{-1}$, injection volume 100 µL) were injected employing an HP1200 auto sampler. A UV-detector was used for following the concentration at the exit of the column. Raw data were processed using the PSS WinGPC Unity software package. Polystyrene of known molecular weight was used as reference to calculate the molecular weight distribution. The number average molecular weight measured by GPC is denominated as $M_n$ (GPC) in the examples.
NMR Spectroscopy (NMR):

NMR spectra of the polymeric products were recorded by a 400 MHz Bruker AV400 spectrometer and processed by means of Bruker TopSpin V3.2 software. DMSO-d6 (Dimethylsulfoxide d6, 99.80%, eurisotop) was applied as deuterated solvent.
Thermogravimetric Analysis (TGA):

The stability of the polyoxazolidinones was characterized by thermogravimetric analysis (TGA). The measurements were performed on a Mettler Toledo TGA/DSC 1. The sample (6 to 20 mg) was heated from 25° C. to 600° C. with a heat rate of 10 K/min and the relative weight loss followed in dependence of temperature. For data analysis the software STARe SW 11.00 was used. As decomposition temperature the inflection point of the sinuidal weight loss curve is stated.
Differential Scanning Calorimetry, (DSC):

The glass transition point was recorded on a Mettler Toledo DSC 1. The sample (4 to 10 mg) was heated from 25° C. to 250° C. with a heating rate of 10 K/min. For data analysis the software STAR$^e$ SW 11.00 was used. For determination of the glass transition temperature a tangential analysis method was used. The midpoint of the intersection point between the tangent at low temperature and the tangent in the mid temperature range and the intersection point between the tangent in the mid temperature range and the tangent at high temperature is stated. The reported Tg was taken from the third heating cycle.

Processing Parameters for Polymer Foils Made from Polyoxazolidinone:

3-4 g of polyoxazolidinone powder were homogeneously placed onto a polyimide foil and covered with a second polyimide foil. This was placed between two 12 mm steel plates and moved into a hot-press, which was preheated to 230° C. The powder was heated for 4 min at 400 N to remove all trapped air and subsequently pressed for 240 s at 2300 N to give a 0.4 mm polymer foil. Further 600 s at 6000 N gave 0.25 mm polymer foils and further 600 s at 22300 N gave 0.20 mm polymer foils.

After cooling to room-temperature the as prepared foils were trimmed manually to 50 mm (diameter) polymer discs with a 50 mm stainless steel cutter.

Flexibility Testing for Foils Made from Polyoxazolidinone:

Polymer discs ((i) top view, (ii) side view) having a diameter of 50 mm (1) and various thicknesses (2) from 0.2 mm to 0.4 mm in FIG. 1 were fixed onto the top surface of a rigid and durable polystyrene block (3) with a straight edge to bend the polymer disc properly (4). A section of 10 mm (5) as measured from the circumference pointing radially inwards affixed to the surface and the remaining portion of the discs of 40 mm (6) being freely suspended, the discs were then bent downwards and the angle at which they broke apart was recorded. The minimum possible angle is 0° (7) and maximum possible angle of bending for this test was 900 (8). The temperature was kept constant at 22.5° C. during the measurement and the measurement did not take longer than 240 s. As fixation of the polymer disc (1) a polypropylene tape was used (170 mm×50 mm for each strip; polypropylene tape—EAN 8717868050673, 40 m thickness with antistatic coating on 66m reel). The surface of the polymer as well as the polystyrene block (3) was cleaned with iso-propanol prior to each measurement. The tape was replaced after each measurement. The measuring equipment for the determination of the bending angle should have an accuracy of 1° (the error of the measurement should therefore be in the range of 1°). The bending of the polymer disc is performed manually with the help of a stainless steel tweezers (preferably with a broad tip; 3-5 mm). The bending speed from the minimum possible angle of 0° (7) to the maximum possible angle of bending of 90° (8) should not exceed 10°/s or 1 cm/s. To account for the warping and flexing of the disc, the bending angle is defined as the angle that a straight line connecting the contact area of the disc at the block with the area of the disc which is grabbed by tweezers and pulled downwards. The bending angle (9) that the polymer disc (1) breaks is named as the breaking angle (10).

E-Module/Elongation at Yield/Break:

The samples were converted on a formica PLAST mikroinjection moulding machine with a 7 mm pre-plastification piston and a 3 mm injection plunger to the correspondent test bars (Cylinder temperature 270-280° C., mould temperature 150-160° C., injection speed 180-200 mm/s).

Tensile tests to determine the e-modulus and the elongation at yield/break were performed with shouldered test bars (1.7 mm×19.5 mm×0.3 mm) at room temperature (23° C.) according to ISO 527 (Version from 1996).

Preparation of the Polyoxazolidinone Compounds:

Comparative Example 1 Synthesis of a Polyoxazolidinone by Reaction of the Isocyanate $A^1$ with a Mixture of Epoxide $B^1$, and Epoxide $B^3$ in the Absence of Epoxide $B^2$ Wherein $n(B^2)/(n(B^1)+n(B^2))=0\%$ The reactions were performed in a 1700 ml stainless steel autoclave, using a helix stirrer. The reactor was charged with epoxide $B^1$ (182.04 g, 535 mmol and epoxide $B^3$ (4.113 g, 21 mmol) in 182 g of o-dichlorobenzene and catalyst C (4.902 g, 11 mmol, 2 mol %). After subsequently flushing with argon, the reactor was sealed and the mixture was heated to 175° C. under stirring (300 rpm). After reaching 175° C., a solution of diisocyanate 1 (95.00 g, 545 mmol) in 378 g dry o-DCB was added with an HPN pump (Knauer) over a period of 90 min (5.4 g/min). After an overall reaction time of 17.5 h, 272 g of NMP were added and the reaction was stirred for 30 min. Then, the reaction mixture was cooled down to room temperature. The resulting reaction mixture was poured into 2000 ml of methanol. The resulting precipitate was shredded using a T25 ULTRA TURRAX® from IKA and stirred in methanol for 16 h. Afterwards it was collected by filtration and washed with methanol twice. The obtained powder was dried at $8\times10^{-3}$ mbar for 1 day.

The presence of oxazolidinone carbonyl group was confirmed by the characteristic IR-signal at $\tilde{v}=1749$ cm$^{-1}$.

The proton NMR spectrum showed the characteristic proton signals at δ 7.66-7.53 (m), 7.50-7.40 (m), 7.35-7.22 (m), 7.15-6.95 (m), 6.92-6.75 (dd), 6.73-6.66 (m), 5.09-4.94 (s), 4.74 (s), 4.36 (s), 4.29-3.99 (m), 3.93-3.83 (m), 3.82-3.70 (m), 2.21 (s), 1.55 (s), 1.23 (s) ppm characteristic for the oxazolidinone moieties (e.g. at 4.9 ppm and 4.1 ppm) and the signal at 1.23 ppm is characteristic for the t.-Bu end group.

The number average molecular weight measured by GPC is 9399 g/mol.

The polyoxazolidinone compound was thermally stable until 419° C.

The glass transition temperature was 175° C.

Example 2: Synthesis of a Polyoxazolidinone by Reaction of the Isocyanate $A^1$ with a Mixture of Epoxide $B^1$. Epoxide $B^2$ and Epoxide $B^3$ Wherein $n(B^2)/(n(B^1)+n(B^2))=3\%$ The reactions were performed in a 1700 ml stainless steel autoclave, using a helix stirrer. The reactor was charged with epoxide $B^1$ (176,58 g, 519 mmol), epoxide $B^2$ (3,501 g, 16 mmol) and epoxide $B^3$ (4.113 g, 21 mmol) in 176 g of o-dichlorobenzene and catalyst C (4.902 g, 11 mmol, 2 mol %). After subsequently flushing with argon, the reactor was sealed and the mixture was heated to 175° C. under stirring (300 rpm). After reaching 175° C., a solution of isocyanate $A^1$ (95.00 g, 545 mmol) in 440 g dry o-DCB was added with an HPN pump (Knauer) over a period of 90 min (5.4 g/min). After an overall reaction time of 5.5 h, 267 g of NMP were added and the reaction was stirred for 30 min. Then, the reaction mixture was cooled down to room temperature. The resulting reaction mixture was poured into 2000 ml of methanol. The resulting precipitate was shredded using a T25 ULTRA TURRAX® from IKA and stirred in methanol for 16 h. Afterwards it was collected by filtration and washed with methanol twice. The obtained powder was dried at $8\times10^{-3}$ mbar for 1 day.

The presence of oxazolidinone carbonyl group was confirmed by the characteristic IR-signal at $\tilde{v}=1749$ cm$^{-1}$.

The proton NMR spectrum showed the characteristic proton signals at δ 7.66-7.61 (m), 7.49-7.41 (m), 7.35-7.25 (m), 7.16-6.99 (m), 6.88-6.77 (dd), 6.75-6.69 (m), 5.11-4.98 (s), 4.74 (s), 4.38 (s), 4.30-4.00 (m), 3.99-3.96 (m), 3.95-3.86 (m), 3.80-3.75 (m), 3.58-3.46 (m), 2.23 (s), 1.56 (s), 1.24 (s) ppm characteristic for the oxazolidinone moieties (e.g. at 4.9 ppm and 4.1 ppm) and the signal at 1.24 ppm is characteristic for the t.-Bu endgroup.

The number average molecular weight measured by GPC is 12177 g/mol.

The polyoxazolidinone compound was thermally stable until 418° C.

The glass transition temperature was 175° C.

Example 3: Synthesis of a Polyoxazolidinone by Reaction of the Isocyanate $A^1$ with a Mixture of Epoxide $B^1$. Epoxide $B^2$ and Epoxide $B^3$ Wherein $n(B^2)/(n(B^1)+n(B^2))=5\%$ The reactions were performed in a 1700 ml stainless steel autoclave, using a helix stirrer. The reactor was charged with epoxide $B^1$ (172.94 g, 508 mmol), epoxide $B^2$ (5.836 g, 26.76 mmol) and epoxide $B^3$ (4.112 g, 21 mmol) in 172 g of o-dichlorobenzene and catalyst C (4.902 g, 11 mmol, 2 mol %). After subsequently flushing with argon, the reactor was sealed and the mixture was heated to 175° C. under stirring (300 rpm). After reaching 175° C., a solution of isocyanate $A^1$ (95.00 g, 545 mmol) in 371 g dry o-DCB was added with an HPN pump (Knauer) over a period of 90 min (5.4 g/min). After an overall reaction time of 5.5 h, 272 g of NMP were added and the reaction was stirred for 30 min. Then, the reaction mixture was cooled down to room temperature. The resulting reaction mixture was poured into 2000 ml of methanol. The resulting precipitate was shredded using a T25 ULTRA TURRAX® from IKA and stirred in methanol for 16 h. Afterwards it was collected by filtration and washed with methanol twice. The obtained powder was dried at $8\times10^{-3}$ mbar for 1 day.

The presence of oxazolidinone carbonyl group was confirmed by the characteristic IR-signal at $\tilde{v}=1749$ cm$^{-1}$.

The proton NMR spectrum showed the characteristic proton signals at δ 7.66-7.61 (m), 7.49-7.41 (m), 7.35-7.25 (m), 7.16-6.99 (m), 6.88-6.77 (dd), 6.75-6.69 (m), 5.11-4.98 (s), 4.74 (s), 4.38 (s), 4.30-4.00 (m), 3.99-3.96 (m), 3.95-3.86 (m), 3.80-3.75 (m), 3.58-3.46 (m), 2.23 (s), 1.56 (s), 1.24 (s) ppm characteristic for the oxazolidinone moieties (e.g. at 4.9 ppm and 4.1 ppm) and the signal at 1.24 ppm is characteristic for the t.-Bu end group.

The number average molecular weight measured by GPC is 18260 g/mol.

The polyoxazolidinone compound was thermally stable until 414° C.

The glass transition temperature was 181° C.

Example 4: Synthesis of a Polyoxazolidinone by Reaction of the Isocyanate $A^1$ with a Mixture of Epoxide $B^1$. Epoxide $B^2$ and Epoxide $B^3$ Wherein $n(B^2)/(n(B^1)+n(B^2))=8\%$ The reactions were performed in a 1700 ml stainless steel autoclave, using a helix stirrer. The reactor was charged with epoxide $B^1$ (167,48 g, 420 mmol), epoxide $B^2$ (9,337 g, 43 mmol) and epoxide $B^3$ (4.113 g, 21 mmol) in 167 g of o-dichlorobenzene and catalyst C (4.902 g, 11 mmol, 2 mol %). After subsequently flushing with argon, the reactor was sealed and the mixture was heated to 175° C. under stirring (300 rpm). After reaching 175° C., a solution of isocyanate $A^1$ (95.00 g, 545 mmol) in 460 g dry o-DCB was added with an HPN pump (Knauer) over a period of 90 min (5.4 g/min). After an overall reaction time of 5.5 h, 267 g of NMP were added and the reaction was stirred for 30 min. Then, the reaction mixture was cooled down to room temperature. The resulting reaction mixture was poured into 2000 ml of methanol. The resulting precipitate was shredded using a T25 ULTRA TURRAX® from IKA and stirred in methanol for 16 h. Afterwards it was collected by filtration and washed with methanol twice. The obtained powder was dried at $8\times10^{-3}$ mbar for 1 day.

The presence of oxazolidinone carbonyl group was confirmed by the characteristic IR-signal at $\tilde{v}=1749$ cm$^{-1}$.

The proton NMR spectrum showed the characteristic proton signals at δ 7.66-7.61 (m), 7.49-7.41 (m), 7.35-7.25 (m), 7.16-6.99 (m), 6.88-6.77 (dd), 6.75-6.69 (m), 5.11-4.98 (s), 4.74 (s), 4.38 (s), 4.30-4.00 (m), 3.99-3.96 (m), 3.95-3.86 (m), 3.80-3.75 (m), 3.58-3.46 (m), 2.23 (s), 1.56 (s), 1.24 (s) ppm characteristic for the oxazolidinone moieties (e.g. at 4.9 ppm and 4.1 ppm) and the signal at 1.24 ppm is characteristic for the t.-Bu endgroup.

The number average molecular weight measured by GPC is 11290 g/mol.

The polyoxazolidinone compound was thermally stable until 419° C.

The glass transition temperature was 173° C.

Example 5: Synthesis of a Polyoxazolidinone by Reaction of the Isocyanate $A^1$ with a Mixture of Epoxide $B^1$, Epoxide $B^2$ and Epoxide $B^3$ Wherein $n(B^2)/(n(B^1)+n(B^2))=10\%$ The reactions were performed in a 1700 ml stainless steel autoclave, using a helix stirrer. The reactor was charged with epoxide $B^1$ (120,72 g, 355 mmol), epoxide $B^2$ (8,600 g, 39 mmol) and epoxide $B^3$ (3.030 g, 16 mmol) in 121 g of o-dichlorobenzene and catalyst C (3.612 g, 8 mmol, 2 mol %). After subsequently flushing with argon, the reactor was sealed and the mixture was heated to 175° C. under stirring (300 rpm). After reaching 175° C., a solution of isocyanate $A^1$ (70.00 g, 402 mmol) in 396 g dry o-DCB was added with an HPN pump (Knauer) over a period of 90 min (5.4 g/min). After an overall reaction time of 5.5 h, 258 g of NMP were added and the reaction was stirred for 30 min. Then, the reaction mixture was cooled down to room temperature. The resulting solidified reaction mixture was given into 2000 ml of methanol. The crude precipitate was shredded using a T25 ULTRA TURRAX® from IKA and stirred in methanol for 16 h. Afterwards it was collected by filtration and washed with methanol twice. The obtained powder was dried at $8\times10^{-3}$ mbar for 1 day.

Dissolution of the polymer in various polar aprotic solvents (e.g. NMP, DMAc, DMSO) or their mixtures was not possible.

The presence of oxazolidinone carbonyl group was confirmed by the characteristic IR-signal at $\tilde{v}=1749$ cm$^{-1}$.

The proton NMR spectrum showed the characteristic proton signals at δ 7.66-7.61 (m), 7.49-7.41 (m), 7.35-7.25 (m), 7.16-6.99 (m), 6.88-6.77 (dd), 6.75-6.69 (m), 5.11-4.98 (s), 4.74 (s), 4.38 (s), 4.30-4.00 (m), 3.99-3.96 (m), 3.95-3.86 (m), 3.80-3.75 (m), 3.58-3.46 (m), 2.23 (s), 1.56 (s), 1.24 (s) ppm characteristic for the oxazolidinone moieties (e.g. at 4.9 ppm and 4.1 ppm) and the signal at 1.24 ppm is characteristic for the t.-Bu end group.

The polymer could not be completely dissolved in DMSO d6.

The number average molecular weight of the soluble parts measured by GPC in DMAc is 12595 g/mol.

The polyoxazolidinone compound was thermally stable until 394° C.

The glass transition temperature was 176° C.

Comparison of the Glass Transition Temperature ($T_g$) and Decomposition Temperature ($T_d$) for examples 1 to 5:

| Example | $B^2/(B^1 + B^2)$ [mol/mol] * 100 | $M_n$ [g/mol] | $T_d$ [° C.] | $T_g$ [° C.] |
|---|---|---|---|---|
| 1 (comp.) | 0 | 9398 | 419 | 175 |
| 2 | 3 | 12177 | 418 | 175 |
| 3 | 5 | 18260 | 414 | 181 |
| 4 | 8 | 11290 | 419 | 173 |
| 5 (comp.) | 10 | 12595[a)] | 394 | 176 |

[a)]only solubilized part of formed polyoxazolidinone

Polyoxazolidone compounds according to inventive examples 2-4 containing flexible epoxide compound ($B^2$) show similar glass transition temperature $T_G$ and decomposition temperature $T_D$ compared to polyoxazolidone compound without flexible epoxide compound ($B^2$) presented in comparative example 1. If too high concentrations of $B^2$ are applied, as shown in comparative example 5, the decomposition temperature $T_D$ decreases.

Comparison to the Flexibility for Examples 1 to 5:

The flexibility was estimated according to the flexibility test as outlined above. The results are given in the following table:

| Example | $B^2/(B^1 + B^2)$ [mol/mol] * 100 | Thickness [mm][a)] | | |
|---|---|---|---|---|
| | | 0.20 | 0.25 | 0.40 |
| | | Breaking angle [°][b)] | | |
| 1 (comp.) | 0 | 80 | 65 | 46 |
| 2 | 3 | 90+ | 90+ | — |
| 3 | 5 | 90+ | 90+ | 90+ |
| 4 | 8 | 90+ | 90+ | — |

[a)]Thickness corresponds to number (2) in FIG. 1;
[b)]corresponds to number (10) in FIG. 1
"90+" denotes that the sample disc did not break at the maximum possible angle of 90° during this test. The samples from the comparison example broke at angles of 65 and 46 degrees.

E-Module/Elongation at Break:

| Example | $B^2/(B^1 + B^2)$ [mol/mol] * 100 | E-Module [MPa] | Tension $\sigma_B$ [MPa] | Stretching $\varepsilon_B$ [%] | Tension $\sigma_M$ [MPa] | Stretching $\varepsilon_M$ [%] |
|---|---|---|---|---|---|---|
| 1 (comp.) | 0 | 2165 | 63.8 | 3.29 | 64.4 | 3.28 |
| 2 | 3 | 2099 | 74.1 | 4.13 | 74.2 | 4.13 |
| 3 | 5 | 2057 | 99.0 | 9.38 | 107.3 | 8.57 |
| 4 | 8 | 2158 | 69.8 | 3.94 | 70.1 | 3.93 |

Incorporation of the diepoxide $B^2$ leads to a more flexible polymer. Besides reaching the maximum possible bending angle (90°) of the above described test behavior shown above of example 3 and an earlier breakage of comparative example 1 at 80°-46°, this is also shown by a higher tension at break and a higher stretching at break of example 3 compared with the comparative Example 1. At the same time the E-module of example 3 is only slightly lower than the E-module of comparative Example 1. In total, incorporation of $B^2$ leads to tougher breakage behavior in contrast to brittle breakages in the comparative examples.

The invention claimed is:

1. A method for the production of a polyoxazolidinone compound, comprising reacting an isocyanate compound (A) with an epoxide compound (B) in the presence of a catalyst (C), wherein the isocyanate compound (A) comprises a isocyanate compound ($A^1$), wherein the isocyanate compound ($A^1$) comprising at least two isocyanate groups ($I^1 \geq 2$), wherein the epoxide compound (B) comprises a epoxide compound ($B^1$) and an epoxide compound ($B^2$), wherein the epoxide compound ($B^2$) is different from the epoxide compound ($B^1$), wherein the epoxide compound ($B^1$) comprises at least two terminal epoxide groups ($F^1 \geq 2$) linked together by a linking group ($L^1$) and the epoxide compound ($B^2$) comprises at least two terminal epoxide groups ($F^2 \geq 2$)) linked together by a linking group ($L^2$), wherein the linking group ($L^2$) comprises acyclic and covalent bonds to each other free of conjugated multiple bonds within the main chain, wherein the epoxide compound ($B^2$) is present in the epoxide compounds $B^1$ and $B^2$ in an amount of ≥0.01 mol-% to <10 mol-% based on the molar ratio the terminal epoxide groups in the epoxide compound ($B^1$) to the sum of the terminal epoxide groups in the epoxide compound ($B^1$) and terminal epoxide groups in the epoxide compound ($B^2$), and wherein the polyoxazolidinone compound is a thermoplastic polyoxazolidinone, and wherein the epoxide compound ($B^2$) comprises neopentyl glycol diglycidyl ether, 1,6-hexanediol diglycidyl ether, glycerol polyglycidyl ether, trimethylolpropane polyglycidyl ether, pentaerythritol polyglycidyl ether, ethylene glycol diglycidyl ether, diethylene glycol diglycidyl ether, propylene glycol diglycidyl ether, dipropylene glycol diglycidyl ether, or a mixture thereof.

2. The method according to claim 1, which comprises:

adding the isocyanate compound ($A^1$) to the epoxide compound ($B^1$) and the epoxide compound ($B^2$) within the epoxide compound (B) in a continuous or step-wise manner with two or more individual addition steps in the step-wise addition and in each individual addition step the amount of isocyanate compound ($A^1$) added is ≥0.1 weight-% to ≤50 weight-% of the total amount of isocyanate compound ($A^1$) to be added, or adding the isocyanate compound ($A^1$) and the epoxide compound ($B^1$) and the epoxide compound (B2) within the epoxide compound (B) at the same time to the reactor optionally comprising the catalyst (C) and/or a solvent in a continuous or step-wise manner with two or more individual addition steps in the step-wise addition.

3. The method according to claim 1, wherein the epoxide compound ($B^1$) comprises at least one of hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, vinylcyclohexene diepoxide, limonene diepoxide, the diepoxides of double unsaturated fatty acid C1- C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether and diglycidyl isophthalate resorcinol diglycidyl ether, bisphenol A diglycidyl ether, bisphenol F diglycidyl ether, diglycidyl terephthalate, and diglycidyl o-phthalate.

4. The method according to claim 1, wherein the polyoxazolidone additionally comprises a monofunctional epoxide compound ($B^3$) with $F^3=1$ a monofunctional isocyanate compound ($A^2$) with ($I^2$)=1 and/or a monofunctional carbamate compound ($A^3$) with ($I^3$)=1.

5. The method according to claim 4, wherein the monofunctional epoxide compound ($B^3$), the monofunctional isocyanate compound ($A^2$) and/or the monofunctional carbamate compound ($A^3$) comprises at least one of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10 C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide, n-hexylisocyanate, cyclohexyl isocyanate, co-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanatate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3- (2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanate, preferably N-(p-tolyl) carbamate, 4-tert-Butylphenylglycidylether, p-tolyl isocyanate N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate, and N-octyl carbamate.

6. The method according to claim 1, wherein the catalyst (C) is represented by formula (II)

$$[M(R1)(R2)(R3)(R4)]^+{}_n Y^{n-} \qquad (II)$$

wherein
M represents nitrogen, phosphorous or antimony,
(R1), (R2), (R3), (R4) are independently of one another selected from the group comprising linear or branched alkyl groups containing 1 to 22 carbon atoms, optionally substituted with heteroatoms and/or heteroatom containing substituents, cycloaliphatic groups containing 3 to 22 carbon atoms, optionally substituted with heteroatoms and/or heteroatom containing substituents, C1 to C3 alkyl-bridged cycloaliphatic groups containing 3 to 22 carbon atoms, optionally substituted with heteroatoms and/or heteroatom containing substituents and aryl groups containing 6 to 18 carbon atoms, optionally substituted with one or more alkyl groups containing 1 to 10 carbon atoms and/or heteroatom containing substituents and/or heteroatoms,
wherein
(R4) is different from (R1), (R2), and (R3), and
(R4) is selected from the group comprising branched alkyl groups containing 3 to 22 carbon atoms, cycloaliphatic groups containing 3 to 22 carbon atoms, C1 to C3 alkyl-bridged cycloaliphatic groups containing 3 to 22 carbon atoms and aryl groups, containing 6 to 18 carbon atoms, optionally substituted with one or more alkyl groups containing 1 to 10 carbon atoms and/or heteroatom containing substituents and/or heteroatoms,
wherein
(R1), (R2) each represent aryl groups containing 6 to 18 carbon atoms,
Y represents a halide, carbonate, nitrate, sulfate or phosphate anion, and
n represents an integer of 1, 2 or 3.

7. The method according to claim 1, wherein the reaction is performed in high-boiling non-protic halogenated aromatic or high-boiling non-protic aliphatic heterocyclic solvents a halogenated aromatic or aliphatic heterocyclic solvent.

8. The method according to claim 1, wherein the reaction is performed at reaction temperatures of ≥130° C. to ≤280° C.

9. A polyoxazolidinone compound, obtained by the method according to claim 1.

10. The polyoxazolidinone compound according claim 9, wherein, a number average molecular weight $M_n$ of the polyoxazolidinone compound is in the range of ≥320 g/mol to ≤10,000,000 g/mol.

11. Spun fiber comprising the polyoxazolidinone compound according to claim 9.

12. A textile comprising a spun fiber according to claim 11.

13. The method according to claim 1, wherein the isocyanate compound ($A^1$) has two isocyanate groups ($I^1=2$), the epoxide compound ($B^1$) has two terminal epoxide groups ($F^1=2$), the epoxide compound ($B^2$) has two terminal epoxide groups ($F^2=2$), and the epoxide compound ($B^2$) is present in the epoxide compounds $B^1$ and $B^2$ in an amount of 1 to 9 mol %, based on the molar ratio of the terminal epoxide groups in the epoxide compound ($B^1$) to the sum of the terminal epoxide groups in the epoxide compound ($B^1$) and terminal epoxide groups in the epoxide compound ($B^2$).

14. The method according to claim 13, wherein the epoxide compound ($B^2$) is present in the epoxide compounds $B^1$ and $B^2$ in an amount of 3 to 8 mol %, based on the molar ratio of the terminal epoxide groups in the epoxide compound ($B^1$) to the sum of the terminal epoxide groups in the epoxide compound ($B^1$) and terminal epoxide groups in the epoxide compound ($B^2$).

15. The polyoxazolidinone compound according to claim 10, wherein the number average molecular weight Mn of the polyoxazolidinone compound is in the range of ≥480 g/mol to ≤600,000 g/mol.

16. The polyoxazolidinone compound according to claim 10, wherein the number average molecular weight Mn of the polyoxazolidinone compound is in the range of ≥2,000 g/mol to ≤200,000 g/mol.

17. The method according to claim 1, wherein the epoxide compound ($B^2$) is present in the epoxide compounds $B^1$ and $B^2$ in an amount of 0.01 mol-% to 5 mol-% based on the molar ratio the terminal epoxide groups in the epoxide compound ($B^1$) to the sum of the terminal epoxide groups in the epoxide compound ($B^1$) and terminal epoxide groups in the epoxide compound.

18. The method according to claim 1, wherein the epoxide compound ($B^2$) is present in the epoxide compounds $B^1$ and $B^2$ in an amount of 1 mol-% to 5 mol-% based on the molar ratio the terminal epoxide groups in the epoxide compound ($B^1$) to the sum of the terminal epoxide groups in the epoxide compound ($B^1$) and terminal epoxide groups in the epoxide compound.

\* \* \* \* \*

UNITED STATES PATENT AND TRADEMARK OFFICE
CERTIFICATE OF CORRECTION

PATENT NO. : 11,326,018 B2
APPLICATION NO. : 16/325532
DATED : May 10, 2022
INVENTOR(S) : Anna Weber et al.

It is certified that error appears in the above-identified patent and that said Letters Patent is hereby corrected as shown below:

In the Claims

Column 21, Line 32, a -- - -- should be added between the text "C10" and "C18".

Column 21, Line 38 to Line 39, the text "co-chlorohexamethylene isocyanate" should be amended to "ω-chlorohexamethylene isocyanate".

Signed and Sealed this
Seventh Day of March, 2023

Katherine Kelly Vidal
*Director of the United States Patent and Trademark Office*